US012798497B2

(12) United States Patent
Kwon et al.

(10) Patent No.: US 12,798,497 B2
(45) Date of Patent: Nov. 17, 2026

(54) VEHICLE DASH INSULATION FOR DRAINING MOISTURE FLOWING DOWN FROM BOTH EDGES OF WINDSHIELD

(71) Applicant: DAEHAN SOLUTION CO., LTD., Incheon (KR)

(72) Inventors: Choong Ho Kwon, Seoul (KR); Lee Tae Ung, Incheon (KR)

(73) Assignee: DAEHAN SOLUTION CO., LTD, Incheon (KR)

( * ) Notice: Subject to any disclaimer, the term of this patent is extended or adjusted under 35 U.S.C. 154(b) by 248 days.

(21) Appl. No.: 18/932,136

(22) Filed: Oct. 30, 2024

(65) Prior Publication Data

US 2025/0162517 A1 May 22, 2025

(30) Foreign Application Priority Data

Nov. 20, 2023 (KR) ........................ 10-2023-0161037

(51) Int. Cl.

*B60R 13/07* (2006.01)
*B60R 13/08* (2006.01)
*B62D 25/14* (2006.01)

(52) U.S. Cl.

CPC .............. *B60R 13/07* (2013.01); *B60R 13/08* (2013.01); *B60R 13/083* (2013.01); *B62D 25/14* (2013.01)

(58) Field of Classification Search

None

See application file for complete search history.

(56) References Cited

U.S. PATENT DOCUMENTS 8,276,710 B2 * 10/2012 Soltau ................. B29C 44/0407 52/145
10,829,061 B2 * 11/2020 Petley ................. B60R 13/0876
12,065,084 B2 * 8/2024 Schulze ................ B32B 25/045
2022/0315796 A1 * 10/2022 Fushiki ................ B60R 13/083

FOREIGN PATENT DOCUMENTS

| | | |
|---|---|---|
| KR | 10-1126926 | 3/2012 |
| KR | 10-20160132509 | 11/2016 |
| KR | 10-20180007383 | 1/2018 |

* cited by examiner

*Primary Examiner* — Nicholas McFall
(74) *Attorney, Agent, or Firm* — Dickinson Wright PLLC

(57) ABSTRACT

As moisture flowing down along side edges of a pillar A or a windshield comes into contact with a dash panel, guide paths are formed so that such moisture flows along predetermined paths, a drainage hole is formed at an end of the guide paths to guide the guided moisture to a surface of a dash insulation facing a dash panel, thereby preventing moisture from flowing down along the surface of the dash insulation to be accumulated in electronic devices of the cluster and the like, thereby enabling safe driving. In addition, such guide paths are formed at upper corner portions of a dash insulation, and the guide path formed at a passenger seat is formed so that collected moisture naturally flows down due to gravity through side edges of the dash insulation, thereby achieving secure and safe use without affecting nearby electronic devices.

4 Claims, 6 Drawing Sheets

VEHICLE DASH INSULATION FOR DRAINING MOISTURE FLOWING DOWN FROM BOTH EDGES OF WINDSHIELD

CROSS-REFERENCE TO RELATED APPLICATION

This application claims priority to and the benefit of Korean Patent Application No. 10-2023-0161037, filed on Nov. 20, 2023, the disclosure of which is incorporated herein by reference in its entirety.

BACKGROUND

1. Field of the Invention

The present invention relates to a vehicle dash insulation, and more specifically, to a vehicle dash insulation, which allows moisture flowing down from both edges of a windshield, such as when tinting an inner side of the windshield, to be collected and the moisture to be drained between a dash panel and a dash insulation or allows the collected moisture to drain through side edges of the dash insulation, thereby preventing moisture from flowing onto the front of the dash insulation, such as towards a cluster, to prevent the occurrence of electrical and electronic accidents caused by moisture.

2. Discussion of Related Art

In general, vehicle glass surfaces are tinted to block ultraviolet rays from sunlight from entering a vehicle indoors so as to protect the interior of a vehicle and passengers and absorb or reflect solar energy to maintain a steady internal temperature of the vehicle, thereby reducing a load on an air conditioner, increasing fuel efficiency, and preventing glares while a driver is driving to enable safe driving.

Such a tinting technology has been published in various ways as in Patent Documents 1 to 3 provided below.

(Patent Document 1) Korean Laid-Open Patent No. 10-2018-0007383)

Patent Document 1 relates to a liquid crystal tinting device capable of overcoming a difficulty in securing a field of view due to glares caused by sunlight or high beams from an opposite lane when driving a vehicle and adjusting the amount of transmitted light based on illuminance, which includes a liquid crystal film that is attached to a windshield and is capable of adjustment of the concentration thereof, an adjustment unit for setting a concentration of the liquid crystal film, a detection sensor unit for numerically quantifying a change in the external environment into data, and a control unit for receiving data from the detection sensor unit and adjusting the concentration of the liquid crystal film according to a set program.

(Patent Document 2) Korean Laid-Open Patent No. 10-2016-0132509)

Patent Document 2 relates to an easy-to-install tinting film for a vehicle and an apparatus for manufacturing the same, and more specifically, to an easy-to-install tinting film for a vehicle, which has been developed to prevent the lifting of a tinting film caused by curvature when the tinting film is attached to glass windows, especially a windshield, of a vehicle and make tinting installation work easier, in which the tinting film for a vehicle, which is wound around a cylindrical winding drum and attached to the windshield of the vehicle, includes a flat portion formed to be flat in a central portion and extending in a longitudinal direction and a curved portion heated and bent upward or downward by heat at both sides of the flat portion by having a curved portion, and an apparatus for manufacturing the easy-to-install tinting film for a vehicle, which includes a cylindrical unwinding drum around which a tinting film is wound, one or more guide rollers that guide a path of the tinting film supplied from the unwinding drum, a curve processing part that applies heat to both sides of the tinting film so that the curved portion that is heated and bent downward by heat at both sides of a flat portion formed to be flat in a central portion by a heat-induced shrinkage phenomenon is formed, and a winding drum that is formed in a cylindrical shape to wind the tinting film, on which the curved portion has been formed through the curve processing part.

(Patent Document 3) Korean Patent Registration No. 10-1126926

A tinting device for a vehicle is disclosed. The disclosed tinting device for a vehicle includes a base frame, a lower holder unit that is installed to move vertically with respect to the base frame and supports a vehicle windshield, an upper holder unit that is rotatably installed on an upper portion of the base frame and supports the vehicle windshield, a first driving unit for vertically moving the lower holder unit, a second driving unit for rotating the lower holder unit, a third driving unit for rotating the upper holder unit, and a control unit for controlling the first to third driving units.

RELATED ART DOCUMENTS

Patent Documents (Patent Document 1) Korean Laid-Open Patent No. 10-2018-0007383 (published date: Jan. 23, 2018)

(Patent Document 2) Korean Laid-Open Patent No. 10-2016-0132509 (published date: Nov. 21, 2016)

(Patent Document 3) Korean Patent Registration No. 10-1126926 (registered date: Mar. 7, 2012)

SUMMARY OF THE INVENTION

Meanwhile, when a tinting film is attached to a windshield, the tinting film is attached to a surface of the windshield exposed to an indoors, and in this case, in order to attach the tinting film, after water is sprayed on the indoor side of the windshield, the tinting film is attached. Then, such sprayed water is pushed out to both edges of the windshield while the tinting film is attached so that the tinting film attachment and air removal work are performed at the same time. As such tinting work is performed, the following problems occur.

(1) As the water sprayed for attaching the tinting film is pushed out to the side edges of the windshield, the water falls down along the side edges of the windshield or edges of a pillar A.

(2) Such water that falls down falls toward a cluster (dashboard), and some water may flow into the cluster, causing moisture to be accumulated inside electronic devices.

(3) Such accumulated moisture may cause a short in the electronic devices or components of the cluster, preventing the electronic devices from operating normally or interfering with safe driving of a driver, leading to an accident.

(4) Meanwhile, when a difference in temperature between the inside and outside of the vehicle is great, there is a situation in which a driver wipes a windshield to secure a driving field of view, and in such a situation, when wiping the windshield, moisture may flow down along the edges of the pillar A or the edges of the windshield and flow toward the electronic devices of the cluster, leading to an accident.

(5) In particular, the cluster shows information necessary for driving, such as a speed, RPM, fuel level, and engine temperature of a vehicle, and when a driver cannot obtain this information, the driver may be severely hindered from driving safely.

Considering such a point, the present invention is directed to providing a vehicle dash insulation for draining moisture flowing down from both edges of a windshield, in which guide paths have been formed so that such moisture flows along predetermined paths, and drainage holes have been formed at ends of the guide paths to guide the guided moisture to a surface of a dash insulation facing a dash panel as moisture flowing down along side edges of a pillar A or the windshield comes into contact with a dash panel, thereby preventing moisture from flowing down along the surface of the dash insulation to be accumulated in electronic devices of the cluster and the like, thereby enabling safe driving.

In addition, the present invention is also directed to providing a vehicle dash insulation for draining moisture flowing down from both edges of a windshield, in which guide paths are formed at upper corner portions of a dash insulation, and the guide path formed at a passenger seat side is formed so that collected moisture naturally flows down due to gravity through side edges of the dash insulation, thereby enabling secure and safe use without affecting nearby electronic devices.

In addition, the present invention is also directed to providing a vehicle dash insulation for draining moisture flowing down from both edges of a windshield, in which guide paths have been formed on an inclined surface of a surface of a dash insulation to allow moisture flowing along the inclined surface to be drained along predetermined paths, thereby enabling the safe and convenient use without penetration of moisture into nearby electronic devices.

A vehicle dash insulation for draining moisture flowing down from both edges of a windshield according to the present invention includes an insulation body (10) installed to face a dash panel (P), wherein the insulation body (10) includes two first guide paths (11) formed at both corner portions to guide and collect moisture flowing down from interior edges of the windshield along a surface among both surfaces of the insulation body (10), which does not face the dash panel (P), a drainage hole (12) that drains the moisture collected in the first guide paths (11) to a surface of the insulation body (10) facing the dash panel (P), and a second guide path (13) that guides moisture passing through the drainage holes (12) to a lower portion of a vehicle along the surface of the insulation body (10) facing the dash panel (P).

One drainage hole (12) may be formed at a driver's seat side, and a guide path among the first guide paths (11) formed at a passenger seat side may be connected to side edges of the insulation body (10) to be directly drained along the side edges without passing through the drainage hole.

The first and second guide paths (11, 12) may be formed on an inclined surface of the surface of the insulation body (10) and formed such that the moisture naturally flows down due to gravity.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
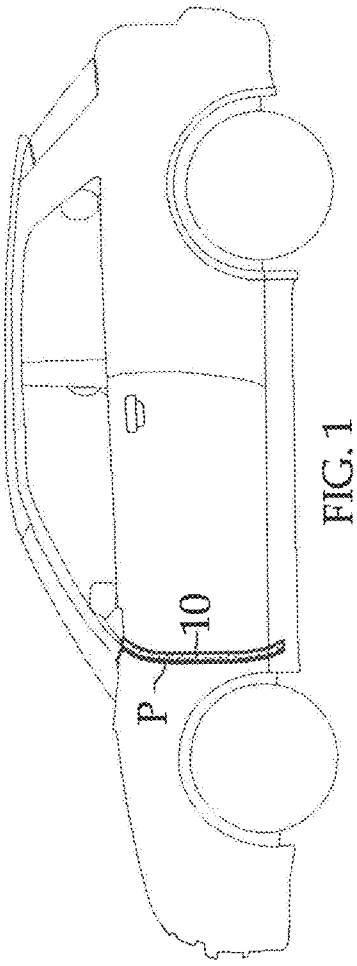
FIG. 1 is a side view showing a vehicle provided with a vehicle dash insulation for draining moisture flowing down from both edges of a windshield according to the present invention.

Hereinafter, exemplary embodiments according to the present invention will be described in detail with reference to the accompanying drawings. Prior to the description, the terms or words used in the specification and claims should not be construed as being limited to their usual or dictionary meanings and should be construed as meanings and concepts consistent with the technical spirit of the present invention according to a principle in which the inventors can appropriately define the concept of the terms in order to describe their inventions by the best method.

Therefore, since embodiments described in the present specification and the configurations shown in the drawings are only the most exemplary embodiments of the present invention and do not represent all of the technical spirit of the present invention, it should be understood that various equivalents and modified examples capable of replacing the embodiments and the configurations may be present at the time that this application is filed.

[Configuration of Vehicle Dash Insulation]

As shown in FIGS. 1 to 6, a vehicle dash insulation for draining moisture flowing down from both edges of a windshield according to the present invention, includes an insulation body 10 installed to face a dash panel.

In particular, as a first guide path 11 and a drainage hole 12 are formed at a corner portion of an upper edge of the insulation body 10 at a driver's seat side, moisture or the like collected in the first guide path 11 may drain between the insulation body 10 and a dash panel P through the drainage hole 12, thereby preventing moisture from penetrating electronic devices and the like of a cluster to enable electrically safe use.

In this case, a second guide path 13 connected to the drainage hole 12 may be formed on a surface facing the dash panel P of the insulation body 10, thereby allowing such moisture guided between the insulation body 10 and the dash panel P to drain to a predetermined position through the second guide path 13.

Meanwhile, the first guide path 11 formed at the corner portion at a passenger seat side is formed on the upper edge of the insulation body 10 to guide the moisture flowing down from an upper portion of the insulation body 10 to a side of the insulation body 10 and discharge the same downward, thereby preventing the moisture flowing down through the edge portions of the windshield and the pillar A from penetrating electronic devices and the like and allowing the moisture to stably drain to the outside.

Hereinafter, such a configuration will be described in more detail with reference to the accompanying drawings. Here, the reference numeral "P" denotes a dash panel that partitions an engine compartment and a vehicle indoors.

Insulation Body

Figure 2:
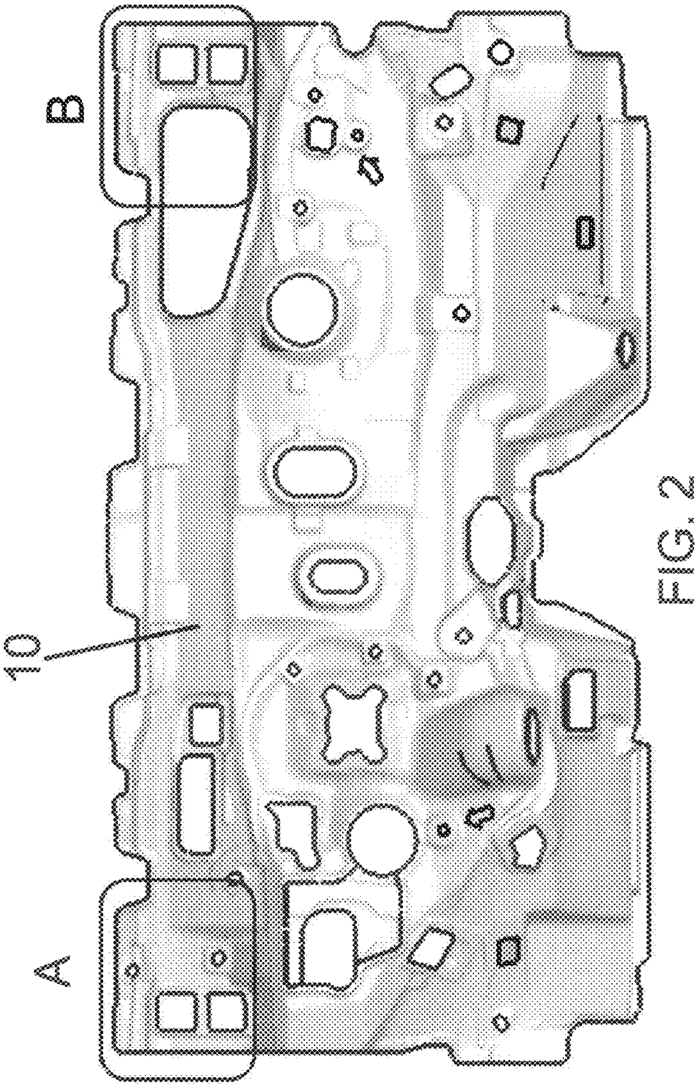
FIG. 2 is a front view showing the vehicle dash insulation for draining moisture flowing down from both edges of a windshield according to the present invention.

As shown in FIGS. 1 and 2, the insulation body 10 is mounted on a surface of the dash panel P that partitions the engine compartment and the vehicle indoors to block heat, vibrations, and noise that are introduced from the engine compartment to the vehicle indoors, thereby maintaining a comfortable indoor environment.

In particular, the insulation body 10 may be used by being manufactured in a single-layer structure as well as in any layer structure according to desired functions. The insulation body 10 may be used by being manufactured using typical technologies used in the technical field to which the present invention pertains.

Meanwhile, as shown in FIGS. 2 to 6, the insulation body 10 includes the first guide paths 11, the drainage holes 12, and the second guide path 13.

A. First Guide Paths

Figure 3:
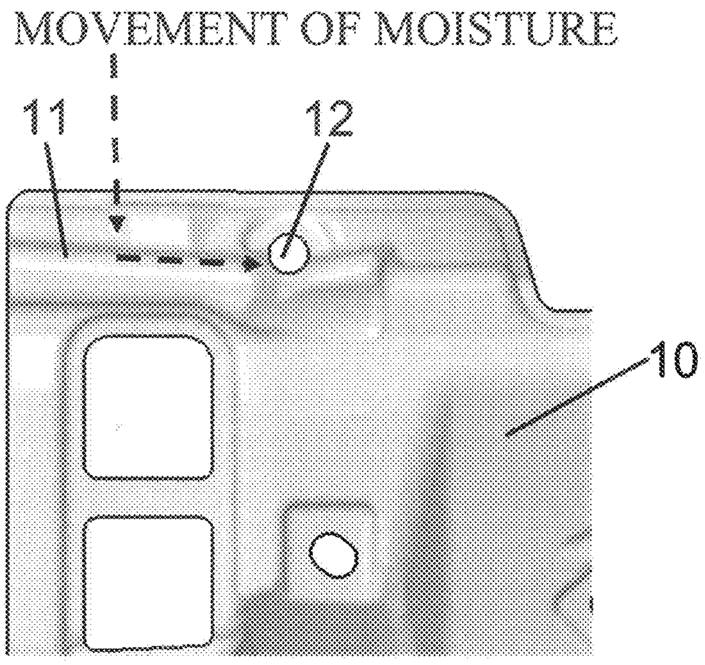
FIG. 3 is an enlarged view of portion "A" in FIG. 2 and shows a corner portion at a driver's seat side of the dash insulation according to the present invention.
Figure 4:
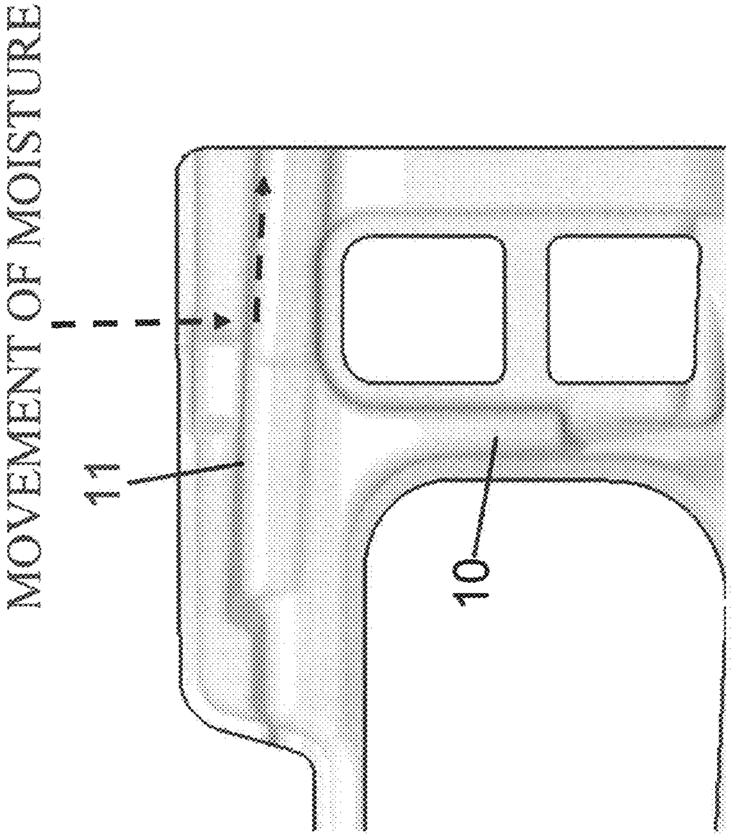
FIG. 4 is an enlarged view of portion "B" in FIG. 2 and shows a corner portion at a passenger seat side of the dash insulation according to the present invention.

As shown in FIGS. 2 to 4, the first guide paths 11 are formed on the surface of the insulation body 10. In this case, the first guide paths 11 are formed to guide and collect moisture flowing down through edges of a pillar A or an edges of a windshield as the moisture flowing down from upper portions of the insulation body 10, for example, moisture sprayed to attach a tinting film on the windshield is pushed out to edges of the windshield. In this case, the first guide paths 11 are formed to guide moisture flowing down from the edges of the pillar A or the windshield along a surface among both surfaces of the insulation body 10, which does not face the dash panel P.

To this end, as shown in FIGS. 2 to 4, the first guide path 11 is preferably formed so that moisture is naturally guided and collected downward along an inclined surface by forming the inclined surface on the insulation body 10.

In addition, as shown in FIGS. 2 and 3, when the first guide path 11 is formed at a corner portion positioned at the driver's seat side of the dash insulation body 10, the first guide path 11 is preferably connected to the drainage hole 12, which is described below, to perform a drainage action. In addition, as shown in FIGS. 2 and 4, when the first guide path 11 is formed at a corner portion positioned at the passenger seat side of the dash insulation body 10, the first guide path 11 is preferably formed so that moisture flowing down from the upper portion of the dash insulation body 10 may be collected and drained downward through the side edge portions of the dash insulation body 10. This is to ensure that moisture and the like that is collected by being guided to the first guide path 11 at the driver's seat side is drained between the insulation body 10 and the dash panel P through the drainage hole 12, which is described below, because electronic devices and the like of the cluster are installed underneath thereof at the driver's seat side, thereby preventing the electronic devices of the cluster from penetrating the electronic devices and the like of the cluster to enable electrically safe use. In addition, since these electrical devices are not installed at the passenger seat side, moisture is drained directly through the side surfaces of the dash insulation body 10.

B. Drainage Holes

As shown in FIGS. 2 and 3, the drainage holes 12, in which moisture or the like are collected, are formed in portions of the first guide paths 11, more preferably, the first guide path 11 formed on the side of the driver's seat. In this case, the drainage hole 12 is formed to pass through the surface of the insulation body 10 so that the moisture collected through the first guide path 11 passes through the drainage hole 12 and flows down along the surface of the dash insulation body 10 facing the dash panel P, thereby preventing the moisture from penetrating the electronic devices and the like of the cluster to prevent the occurrence of electrical accidents caused by moisture.

C. Second Guide Path

Figure 5:
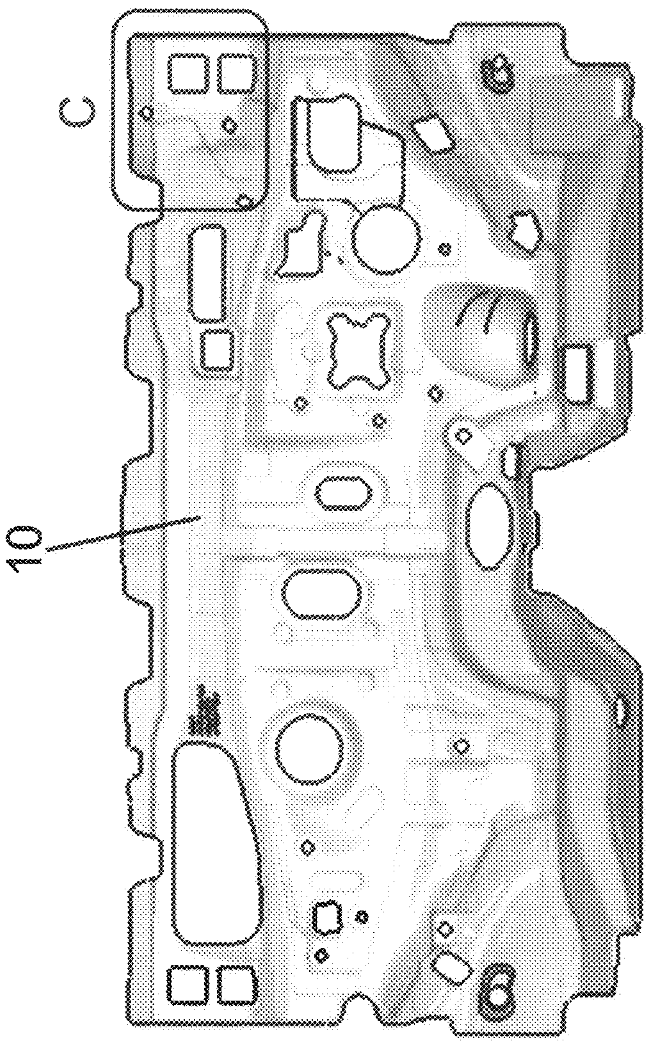
FIG. 5 is a rear view showing the vehicle dash insulation for draining moisture flowing down from both edges of a windshield according to the present invention.
Figure 6:
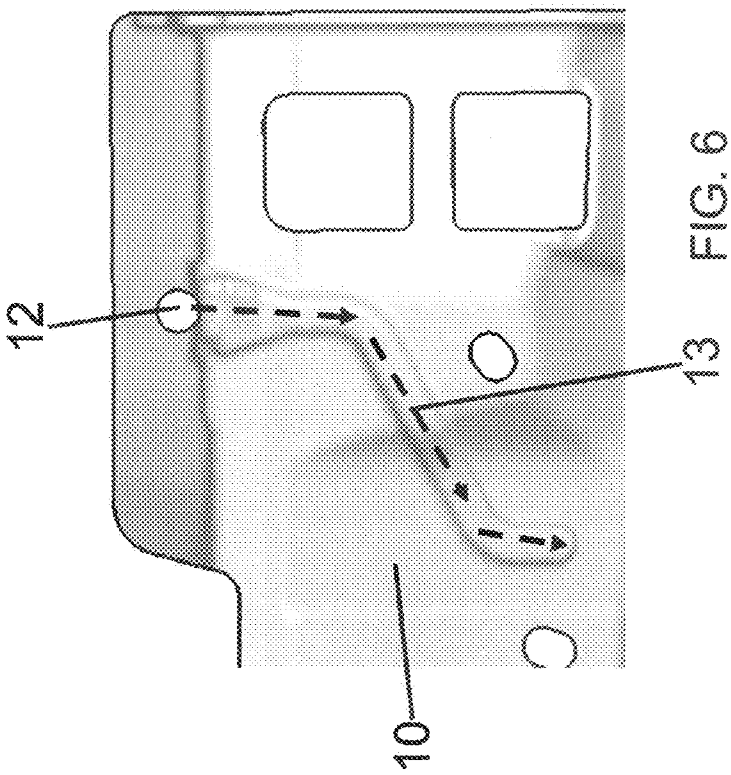
FIG. 6 is an enlarged view of portion "C" in FIG. 5 and shows a corner portion at a driver seat side according to the present invention.

As shown in FIGS. 5 and 6, the second guide path 13 is formed on the surface facing the dash panel P of the insulation body 10. In this case, since the second guide path 13 is formed so that moisture may flow downward from the drainage hole 12, even when moisture flowing down through the edges of the windshield and the edge portions of the pillar A flow down along the insulation body, the moisture may be collected in the drainage hole 12 through the first guide path 11, and as such collected moisture passes through the drainage hole 12, the moisture is drained between the dash insulation body 10 and the dash panel P through the second guide path 13, thereby preventing moisture from penetrating the electronic devices of the cluster.

As described above, according to the present invention, even when moisture or the like generated while conducting work on an inner surface of the windshield flows down along the edges of the pillar A or the edges of the windshield, the moisture may be drained between the insulation body and the dash panel through the guidance of predetermined guide paths and the drainage holes or drained through the side edges of the insulation body at the passenger seat side through the guidance of the guide paths, thereby preventing moisture from penetrating the electronic devices of the cluster to enable electrically safe use.

A vehicle dash insulation for draining moisture flowing down from both edges of a windshield according to the present invention has the following effects.

(1) Since moisture flowing down along edges of a pillar A or edges of a windshield that is close to a driver's seat is guided between a dash insulation and a dash panel through guide paths and drainage holes that are formed on the dash insulation, it is possible to prevent moisture from coming into contact with a cluster device and the like, thereby enabling safe use.

(2) In addition, since the moisture flowing down along the edges of the pillar A or the edges of the windshield is guided to side edges of the dash insulation through the guide paths formed on the dash insulation in order to be drained, it is possible to prevent moisture from penetrating an engine compartment, thereby preventing an accident caused by the moisture.

(3) As the guide paths and the drainage holes are formed together when forming the dash insulation, the guide paths and the drainage holes can be easily formed without a separate forming process in order to perform moisture drainage.

(4) Even when moisture or water droplets are formed on a windshield due to a temperature difference between the inside and outside of the vehicle, and the moisture or water droplets flow down due to gravity, it is possible to prevent moisture from penetrating electronic devices.

What is claimed is:

1. A vehicle dash insulation for draining moisture flowing down from both edges of a windshield, the vehicle dash insulation comprising an insulation body (10) installed to face a dash panel (P), wherein the insulation body (10) includes:

two first guide paths (11) formed at both corner portions to guide and collect moisture flowing down from interior edges of the windshield along a surface among both surfaces of the insulation body (10), which does not face the dash panel (P);

a drainage hole (12) that drains the moisture collected in the first guide paths (11) to a surface of the insulation body (10) facing the dash panel (P); and a second guide path (13) that guides moisture passing through the drainage hole (12) to a lower portion of a vehicle along the surface of the insulation body (10) facing the dash panel (P).

2. The vehicle dash insulation of claim 1, wherein the drainage hole (12) is formed at a driver's seat side, and a guide path among the first guide paths (11) formed at a passenger seat side is connected to a side edge of the insulation body (10) to be directly drained along the side edge without passing through the drainage hole.

3. The vehicle dash insulation of claim 1, wherein the first and second guide paths (11, 12) are formed on an inclined surface of the surface of the insulation body (10) and formed such that the moisture naturally flows down due to gravity.

4. The vehicle dash insulation of claim 2, wherein the first and second guide paths (11, 12) are formed on an inclined surface of the surface of the insulation body (10) and formed such that the moisture naturally flows down due to gravity.

* * * * *